W. R. Pool,
Bread Machine.

No. 103,366. Patented May 24, 1870.

Witnesses:
D. S. Mabee
Alex. F. Roberts

Inventor:
Wm. R. Pool
per Munn & Co.
Attorneys.

United States Patent Office.

WILLIAM R. POOL, OF HAVANA, ALABAMA.

Letters Patent No. 103,366, dated May 24, 1870.

IMPROVED DOUGH-WORKER.

The Schedule referred to in these Letters Patent and making part of the same.

*To all whom it may concern:*

Be it known that I, WILLIAM R. POOL, of Havana, in the county of Hall and State of Alabama, have invented a new and useful Improvement in Dough-Worker; and I do hereby declare that the following is a full, clear, and exact description thereof, which will enable others skilled in the art to make and use the same, reference being had to the accompanying drawing forming part of this specification.

The object of my invention is improvement in that class of machines known as dough-workers or kneaders; and The invention consists in the particular construction of parts, as will be hereinafter fully specified.

Similar letters of reference indicate corresponding parts.

Figure 1:
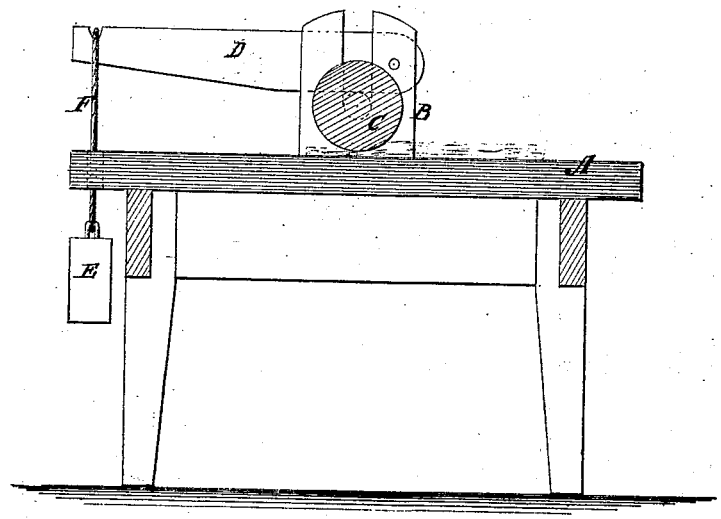
Figure 1 is a sectional elevation of my improved worker.
Figure 2:
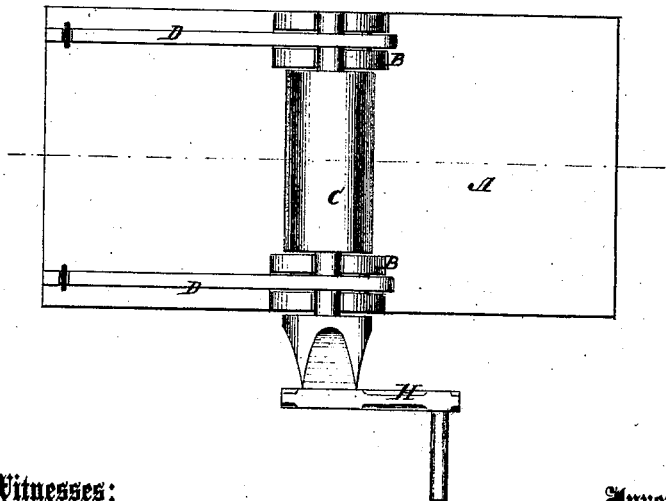
Figure 2 is a plan view of the same.

A is the table.

B the vertical slotted supports, one on each side, at or about the center, lengthwise.

C is the roller, preferably made of wood, and fitted to work in the slots of the bearings B.

D represents the levers, pivoted in slots transversing the slots for the journals, so that they rest on the journals.

E represents the weight suspended from the free ends of the levers, by cords passing through the table, and having loops by which they may be readily attached or detached from the levers, to admit of taking out the rollers when required.

The dough is placed on one side of the table and pressed up to it. It is then turned by the crank H, or otherwise, in the direction to force the dough under it. Then the motion is reversed, and the dough forced back again. These operations are contined as long as required, thoroughly working the dough, making it very white and much lighter without soda or raising-powders than when made any other way with the addition of such powders.

I am aware that elastic or adjustable bearings for square, fluted, or other-formed rollers are not new in this class of invention, and I lay no claim to such.

Having thus described my invention,

I claim as new and desire to secure by Letters Patent—

The removable round roller C, the levers D, pivoted in slots in the vertical bearings B, and provided with the cords F and weights E, in combination with the flat table A, all as shown and described, for the purpose specified.

WILLIAM R. POOL.

Witnesses:
   W. J. JONES,
   W. S. SCARBROUGH.